United States Patent
Young

(10) Patent No.: US 6,477,522 B1
(45) Date of Patent: Nov. 5, 2002

(54) DYNAMIC PERFORMANCE BASED SERVER SELECTION

(75) Inventor: Bruce A. Young, LeMars, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/329,620

(22) Filed: Jun. 10, 1999

(51) Int. Cl.[7] .............................................. G06F 17/30
(52) U.S. Cl. ........................... 707/2; 707/10; 707/201; 707/203; 707/1; 707/3; 707/100; 709/224; 709/248
(58) Field of Search ................................ 709/224, 248; 707/10, 1, 3, 100, 20, 201, 203

(56) References Cited

U.S. PATENT DOCUMENTS

| | | | |
|---|---|---|---|
| 5,049,873 A | 9/1991 | Robins et al. | 340/825.06 |
| 5,261,044 A | 11/1993 | Dev. et al. | 395/159 |
| 5,572,643 A | 11/1996 | Judson et al. | 395/793 |
| 5,687,292 A | 11/1997 | Boda et al. | 395/11 |
| 5,744,669 A | 6/1998 | George et al. | 395/200.54 |
| 5,768,524 A | 6/1998 | Schmidt | 395/200.54 |
| 5,768,578 A | 6/1998 | Kirk et al. | 395/611 |
| 5,771,226 A | 6/1998 | Kaku | 370/232 |
| 5,774,660 A | 6/1998 | Brendel et al. | 395/200.31 |
| 5,774,668 A | 6/1998 | Choquier et al. | 395/200.53 |
| 5,838,906 A | 11/1998 | Doyle et al. | 395/200.32 |
| 5,974,460 A | * 10/1999 | Maddalozzo, Jr. et al. | 709/224 |
| 6,138,155 A | * 10/2000 | Davis et al. | 709/224 |
| 6,212,571 B1 | * 4/2001 | Kikuchi et al. | 709/248 |
| 6,223,221 B1 | * 4/2001 | Kunz | 709/224 |

FOREIGN PATENT DOCUMENTS

WO 98/18076 4/1998 ............. G06F/9/46

OTHER PUBLICATIONS

Hieaiwa, A., et al., "Dynamic load balancing in distributed multimedia systems", *Symp. on Circuits & Systems, IEEE, XP000787863*, 650–653, (1/97).

Katz, E.D., et al., "A scalable HTTP server: the NCSA prototype", *Computer Networks and ISDN Systems, North Holland Publishing, vol. 27, No. 2, XP004037986*, 155–164, (1994).

* cited by examiner

*Primary Examiner*—Diane D. Mizrahi
*Assistant Examiner*—Thuy Pardo
(74) *Attorney, Agent, or Firm*—Scott Charles Richardson; Schwegman, Lundberg, Woesner & Kluth

(57) ABSTRACT

Downloading of Internet files is optimized based on which of multiple locations is most efficient in providing the files. Identical or contiguous portions of a file are downloaded from different servers, and performance data such as a bit rate for each site is used to then select the optimal server to complete the download. An applet intercepts the request for the file from a web browser and determines the best server to provide the file. When the request is intercepted, it reads a list of available file transfer protocol (ftp) locations from which to download the file. The applet or other type of program pings each site to prioritize the list based on shortest response time. The throughput of the finally selected server is tracked as the file is downloaded. If the throughput drops below a desired throughput, the next best server is selected from the previous list, or the selection and tracking process is started again to determine if a faster server has become available due to changes in demand on the servers.

24 Claims, 2 Drawing Sheets

DYNAMIC PERFORMANCE BASED SERVER SELECTION

FIELD OF THE INVENTION

The present invention relates to networked computer systems and in particular to the selection of a server for desired information based on performance.

BACKGROUND

Networks, such as the Internet contain information that a user desires to obtain. The information is contained in files that may be specified by uniform resource locators (URLs) which are essentially addresses which specify the computer and the location of the file on that computer. Many times, several computers, referred to as servers will have the same file available for retrieval by a user. Each such file has a different URL. In some cases, multiple servers may be connected together to appear as a single site and have several individual servers having the same file for increased overall throughput. In such cases, a manager of the servers transparent to the user system selects which individual server or servers should provide the file given a client/user request. The manager may select the server to balance the load between the servers. However, most files on the Internet are located on separate servers and are identified with separate URLs.

When a user tries to access a file, a site is selected, and the file transfer is requested through a browser when a user clicks on highlighted text or image which is associated with the URL, or types in the URL directly. This link identifies only one site, which may be very busy. The user will usually select a site which is geographically closest to the user. This may or may not be the best choice. There is no easy ability for a user to select a different site, other than to stop the transmission of the file after noticing that it is taking a long time, then searching for a different site with the same file and initiating a new transfer. Some sites do offer multiple sites from which to obtain the information, but the user still must make the decision as to which site to use, and if not satisfied, stop the transmission and start over by selecting another site.

A further method of determining which site might respond faster involves the use of a program which will ping a group of selected sites to see which will respond the fastest. A ping is a well known method of sending a message to a server, essentially asking "are you there?" The server will then respond that they are there. While this gives a good indication of the length of time for a download of a file to begin, it provides little information regarding the speed at which such a download will proceed. There is a need for an easier and more informative way to determine which server will provide the fastest download of a file. There is also a need for downloading information or files more quickly.

SUMMARY

Downloading of files is optimized based on which of multiple locations is most efficient in providing the files. In one implementation of the invention, portions of a file are downloaded from different servers, and performance data such as a bit rate for each site is used to then select the optimal server to complete the download.

In a further embodiment, an applet intercepts the request for the file from the browser and determines the best server to provide the file. When the request is intercepted, the applet reads a list of available file transfer protocol (ftp) locations from which to download the file. The list may be hidden text in an hypertext markup language (HTML) page, or may actually be provided by a link on a server. The applet or other type of program then may ping each site to prioritize the list based on shortest response time. A first portion of the file is downloaded from one site, and throughput measurements tracked. Using a reconnect internet protocol command to identify where the first download ended, a second portion of the file is downloaded from the next site on the list, again with throughput measurements tracked. This process is repeated for further portions of the file, and the location with the best throughput is selected to complete the file transfer. In still further embodiments, a same portion such as the first portion is read from each server to ensure consistent throughput measurements.

In yet a further embodiment of the invention, the throughput of the finally selected server is tracked as the file is downloaded. If the throughput drops below a desired throughput, the next best server is selected from the previous list, or the selection and tracking process is started again to determine if a faster server has become available due to changes in demand on the servers.

The present invention provides improved information regarding the best server from which to obtain a desired file, and the ability to download files quickly.

DETAILED DESCRIPTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
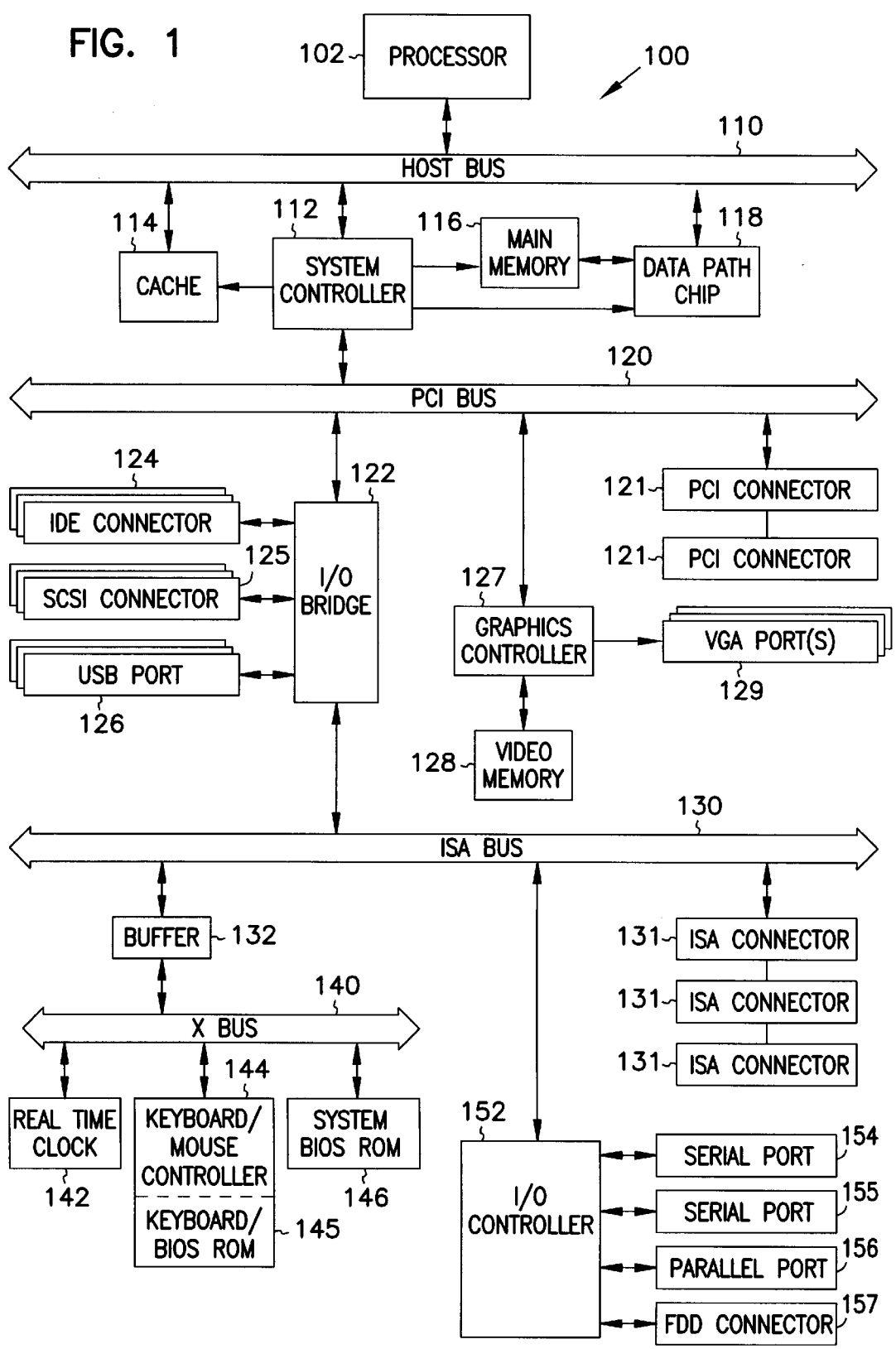
FIG. 1 is a block diagram of a typical computer system in accordance with the present invention.

A standard personal computer system is first described, followed by description of a module, such as an applet that intercepts requests from a browser running on the computer system and determines which server from a list of multiple servers is best to provide the file. The applet may also be a module or modules within the browser itself FIG. 1 shows a block diagram of a personal computer system 100 according to the present invention. In this embodiment, a processor 102, a system controller 112, a cache 114, and a data-path chip 118 are each coupled to a host bus 110. Processor 102 is a microprocessor such as a 486-type chip, a Pentiumrn®, Pentium II® or other suitable microprocessor. Cache 114 provides high-speed local-memory data (in one embodiment, for example, 512 kB of data) for processor 102, and is controlled by system controller 112, which loads cache 114 with data that is expected to be used soon after the data is placed in cache 112 (i.e., in the near future). Main memory 116 is coupled between system controller 114 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that runs at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

Figure 2:
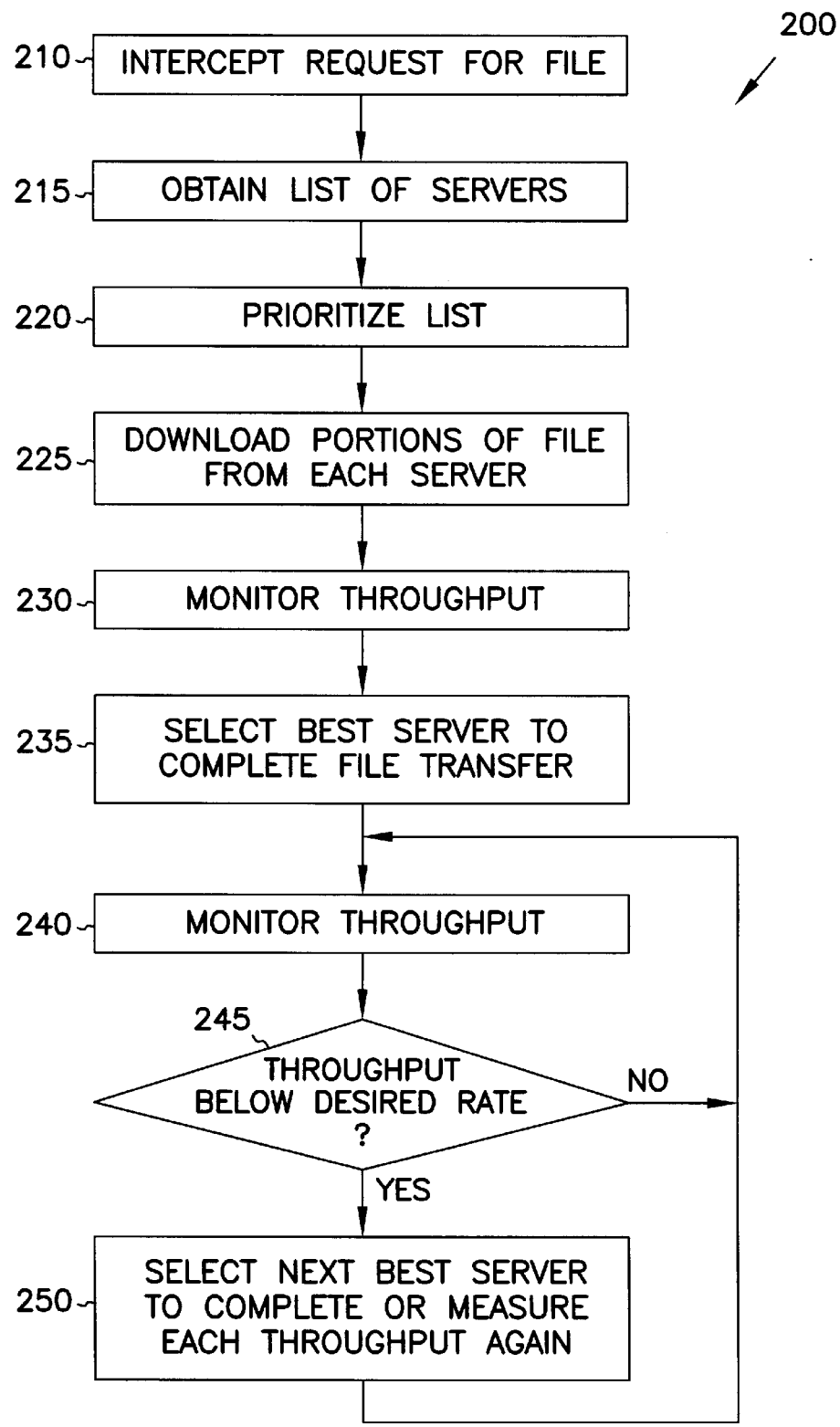
FIG. 2 is a flow chart of a module which determines which server to use for a file transfer.

Computer system 100, or other suitable computer system having a different configuration well known in the art is many times used to run a common browser application which is used to access and properly display information stored on a network such as the Internet. The information may be referred to as a file, which contains multimedia data, or just plain text. Some of the text contains a link or address to other files which may be stored on one or more servers attached to the network. When a user of computer system 100 uses the browser to select the link, an applet indicated generally at 200 in FIG. 2 may be configured to intercept the user's request for the file as indicated at 210. FIG. 2 is a flowchart of the applet 200, which may be run in the browser and set to look for file transfer protocol (ftp) requests or other types of file transfer requests. Each of the blocks or combinations of the blocks describe functionality that may be implemented in one or more software modules which can easily be written by one skilled in the art with reference to the flowchart. The applet may automatically intercept such requests and obtain a list of servers at 215 which contain the desired file by scanning hidden HTML text surrounding the link, or actually scan the current file which contained the link for other visibly rendered links to multiple servers where the information or files may be obtained. In a further embodiment, a user may select a number of server locations from which to obtain the file and provide them directly at 215 without the need for automatic interruption at 210. This can be done by first invoking the applet 200 and then clicking on each of the desired links. Once all the links have been selected, the applet may be requested to process the list. In still a further embodiment, the applet 200 obtains the list of possible servers from the server identified by the initial link.

Once the applet 200 obtains the list, it reads the list, and sends a "ping" to each server at 220, keeping track of the amount of time for each server to respond. This provides an indication of which server responds the fastest, and may be a good candidate from which to obtain the file in the fastest manner. The list may then be prioritized in one embodiment, or may be used as is without any attempt to provide an initial prioritization.

At 225, a first portion of the file is requested from the highest priority server. The throughput of such server is tracked at 230, such as by a bits per second indication. The time for ping response obtained in initially prioritizing the list of servers is subtracted from the time it takes to download the first portion in one embodiment to obtain a better indication of true bit rate. After the first server has completed delivering the first portion of the file, a reconnect internet protocol (IP) command is used to indicate to the second server that a file transfer was interrupted. With some well known handshaking, a starting address is provided to the second server, and a second portion of the file is transferred from the second server. Throughput of this transfer is also tracked and the rest of the servers are contacted in the same manner to obtain further consecutive or contiguous portions of the file. Once all the servers in the list have completed, the performance as measured by throughput is ranked, and the rest of the file is requested at 235 from the highest throughput server which is selected as the optimal server.

The throughput may further be monitored at 240 from the optimal server. This is done because performance may change over time for very large files. If the performance falls below a desired rate at 245, a different server may be selected. Either the next server on the previously generated performance ranked list may be selected for continuation of the transmission, or the performance of each server may be redetermined starting again at 225. If the performance does not fall below a desired rate, the transfer is completed with the elected optimal server.

The desired rate for decision block 245 may be established as a desired percentage of the throughput as determined at step 230, such as 75%. In this manner, if reselection if performed at 250, the desired percentage of throughput is again determined based on the measured throughput of the server which is selected to complete the transmission. A sliding average may be used to smooth out short term variations in transmission rates to prevent frequent switching of servers.

It is to be understood that the above description is intended to be illustrative, and not restrictive. Many other embodiments will be apparent to those of skill in the art upon reviewing the above description. Downloading of files is optimized based on which of multiple locations is most efficient in providing the files. In one implementation of the invention, portions of a file are downloaded from different servers, and performance data such as a bit rate for each site is used to then select the optimal server to complete the download. The size of the portions may be either temporal in nature, such as one or more seconds, or may be based on a predetermined number of bytes or blocks of data. In one embodiment, the first 500 bits are selected as the first portion, the second 500 as the second portion and so on. For small files of a few thousand or more bits, the selection process may be bypassed if desired. Embedded pictures may also be specified by indicating that an entire block should be obtained if encountered prior to completing a specified portion.

The applet may be software stored on computer readable media, and may be written in any of several languages, such as Java (trademark of Sun Microsystems of Palo Alto, Calif.) or other languages. The functionality of the applet may be provided in many of multiple forms, and may be built into the browser itself or as a separate application, or even as part of the operating system. It may be fully automated, or may present the results of the server throughput to the user for user selection. It is usually stored on computer readable medium such as cache 114, main memory 116 or disk drives which are coupled to IDE connector 124, SCSI connector 125 or USB port 126. Further, a carrier wave may be used as a computer readable medium to transmit the applet. The scope of the invention should, therefore, be determined with reference to the appended claims, along with the full scope of equivalents to which such claims are entitled.

What is claimed is:

1. A system for downloading a desired file from a network of multiple servers which have a copy of the file, the system comprising:

means for identifying the locations of the desired file at each server;

means for estimating a throughput rate of transfer of the desired file from each server; and means for selecting the server having the best estimated throughput rate for completing transfer of the desired file;

wherein said means for estimating further comprises:

means for initiating the transfer of selected portions of the file from each server, and means for determining the time to receive the selected portions of the file from each server.

2. The system of claim 1, wherein the selected portions of the file comprise consecutive portion of the file.

3. The system of claim 1 wherein the selected portions of the file comprise substantially the same portion of the file from each server.

4. The system of claim 1 and further comprising:

means for estimating latency of each server; and means for subtracting the latency during the measuring of the throughput of each server.

5. A system for downloading a desired file from a network of multiple servers which have a copy of the file, the system comprising:

means for identifying the locations of the desired file at each server;

means for measuring a latency for each server;

means for measuring a time taken to transfer selected portions of information from each server, means for subtracting the latency from such time taken and to provide a throughput rate; and means for selecting the server having the best measured throughput rate for completing transfer of the desired file;

wherein the selected portions of information comprise substantially the same portion of the desired file from each server.

6. The system of claim 5 wherein the selected portions of information comprise consecutive portions of the desired file.

7. A computerized system for downloading desired files from a network of multiple servers, some of which have a copy of the file, the system comprising:

a module that obtains a list of servers having a copy of a desired file;

a download module that initiates downloading of selected portions of the desired file from multiple servers; and a module that measures the throughput from each of said server and selects an optimal server for completion of downloading of the file; and further comprising a module for monitoring the throughput of the selected optimal server and selecting a new optimal server if the throughput falls below a desired level.

8. The system of claim 7 wherein the module that obtains the list comprises an applet that intercepts file transfer requests from a browser.

9. The system of claim 7 wherein the selected portions comprise consecutive portions of the file.

10. The system of claim 9 wherein the download module issues a reconnect IP command to obtain each consecutive portion by identifying a beginning address of the file.

11. A method of downloading desired files from a network of multiple servers, some of which have a copy of the file, the method comprising:

obtaining a list of servers having a copy of a desired file, downloading selected portions of the desired file from multiple different servers;

measuring the throughput from each server; and selecting an optimal server for completion of the download of the desired file, further comprising monitoring the throughput of the selected optional server; and further comprising selecting a new optimal server if the throughput of the selected optimal server falls below a desired level.

12. The method of claim 11 and further comprising:

measuring a time for response to a message from each server.

13. The method of claim 12 wherein the message comprises a ping.

14. The method of claim 12 wherein the time for response from each server is subtracted from the time measured for downloading each portion from each corresponding server.

15. The method of claim 11 wherein the new optimal server is selected based on previously measured throughput from each server.

16. The method of claim 11 wherein the new optimal server is selected based current measurement of throughput as in claim 14.

17. The method of claim 11 wherein the selected portions comprise the same portion.

18. The method of claim 11 wherein the selected portions comprise consecutive portions of the desired file.

19. The method of claim 11 wherein the size of the selected portions is based on a predetermined number of bits, or on a predetermined time for downloading.

20. A computer readable medium having instructions stored thereon for causing a computer to implement a method of downloading desired files from a network of multiple servers, some of which have a copy of the file, the method comprising:

obtaining a list of servers having a copy of a desired file;

downloading selected portions of the desired file from multiple different servers;

measuring the throughput from each such server; and selecting an optimal server for completion of the download of the desired file; and further comprising monitoring the throughput of the selected optimal server and selecting a new optimal server if the throughput falls below a desired level; completing downloading of the file.

21. A computer readable medium having instructions stored thereon for causing a computer to implement a method of downloading desired files from a network of multiple servers, some of which have a copy of the file, the method comprising:

obtaining a list of servers having a copy of a desired file;

downloading selected portions of the desired file from multiple different servers;

measuring the throughput from each such server;

selecting an optimal server for completion of the download of the desired file;

monitoring the throughput as the selected optimal server downloads the rest of the file; and redetermining an optimal server if the throughput of the selected optimal server falls below a desired level.

22. A computer implemented method of selecting a server for downloading a desired file from a network of multiple servers which have a copy of the file, the method comprising:

identifying the locations of the desired file at each server;

measuring a latency for each server;

measuring a time taken to transfer selected portions of information from each server;

subtracting the latency from such time taken and to provide a throughput rate; and selecting the server having the best measured throughput rate for completion of transfer of the desired file;

wherein the selected portions of information comprise substantially the same portion of the desired file from each server.

23. The method of claim 22 and further comprising:

transferring remaining portions of the file from the selected server.

24. A computer readable medium having instructions stored thereon for causing a computer to perform the method of claim 22.

* * * * *